(12) United States Patent
Rindi

(10) Patent No.: US 9,377,335 B2
(45) Date of Patent: Jun. 28, 2016

(54) FLOW RATE SENSOR PROBE HAVING CONTACTLESS FORCE TRASNMITTING STRUCTURE

(75) Inventor: Piero Rindi, Pisa (IT)

(73) Assignees: INGEGNERIE TOSCANE S.R.L., Florence (IT); BRE ELETTRONICA S.R.L., San Giulianoterme (IT)

( * ) Notice: Subject to any disclaimer, the term of this patent is extended or adjusted under 35 U.S.C. 154(b) by 93 days.

(21) Appl. No.: 13/976,708

(22) PCT Filed: Jan. 2, 2012

(86) PCT No.: PCT/IB2012/000003
§ 371 (c)(1),
(2), (4) Date: Jul. 31, 2013

(87) PCT Pub. No.: WO2012/101490
PCT Pub. Date: Aug. 2, 2012

(65) Prior Publication Data
US 2013/0312536 A1    Nov. 28, 2013

(30) Foreign Application Priority Data

Dec. 31, 2010  (IT) .............................. PI2010A0145

(51) Int. Cl.
  *G01F 1/28*  (2006.01)
  *G01F 1/56*  (2006.01)

(52) U.S. Cl.
  CPC ... *G01F 1/56* (2013.01); *G01F 1/28* (2013.01)

(58) Field of Classification Search
  None
  See application file for complete search history.

(56) References Cited

U.S. PATENT DOCUMENTS

| 3,238,773 A | * | 3/1966 | Leigh, Jr. ................... 73/170.26 |
| RE27,354 E | * | 5/1972 | Wiebe et al. .................. 374/142 |
| 4,604,906 A | * | 8/1986 | Scarpa ........................ 73/861.74 |
| 4,788,869 A | * | 12/1988 | Li .............................. 73/861.71 |
| 5,131,265 A | * | 7/1992 | Tobin et al. ................... 73/54.23 |
| 5,282,389 A | * | 2/1994 | Faivre .................. A01D 41/127 73/861.74 |
| 6,003,387 A | * | 12/1999 | Larson ....................... G01F 1/30 73/861.74 |
| 6,032,540 A | * | 3/2000 | Hawkins .................... 73/861.75 |

(Continued)

FOREIGN PATENT DOCUMENTS

| DE | 1943021 A1 | 3/1970 |
| GB | 2128744 A | 5/1984 |
| WO | 9950621 A1 | 10/1999 |

OTHER PUBLICATIONS

International Search Report date Aug. 17, 2012, corresponding to PCT/IB2012/000003.

*Primary Examiner* — Harshad R Patel
(74) *Attorney, Agent, or Firm* — Ladas & Parry LLP

(57) ABSTRACT

A flowrate sensor includes first and second portions to be mounted protruding inside and the duct, respectively, includes a probe constrained to the first portion responsive to the flowrate and arranged to move from a rest position to a measuring position under a fluid dynamic thrust, the sensor having a load cell constrained to the second portions and arranged to receive a force from the probe responsive to the measuring position and configured to maintain a corresponding electric measurement signal, wherein first and second portions are fluid-tightly separated by a wall, and the probe and the load cell are configured for transferring a magnetic force between the probe and the cell, through the wall, without contacting each other, first and second portion being preferably housed within an elongated container whose first and second parts house first and second portions and protrude inside and outside the duct, respectively.

12 Claims, 4 Drawing Sheets

(56) References Cited

U.S. PATENT DOCUMENTS

| | | | | |
|---|---|---|---|---|
| 6,098,456 A * | 8/2000 | Munck | ............... | G01F 1/075 73/861.94 |
| 6,125,697 A * | 10/2000 | Holton | ............ | G01F 23/0038 324/207.14 |
| 6,196,070 B1 * | 3/2001 | Piascik et al. | ............ | 73/861.74 |
| 6,212,958 B1 * | 4/2001 | Conley | ............ | 73/861.74 |
| 6,253,625 B1 * | 7/2001 | Samuelson et al. | ...... | 73/861.71 |
| 6,453,741 B1 * | 9/2002 | Beck, II | ............ | G01F 23/38 340/623 |
| 2006/0248961 A1 | 11/2006 | Shachar et al. | | |
| 2009/0064777 A1 * | 3/2009 | Mundo | ............ | G01F 23/38 73/317 |

\* cited by examiner

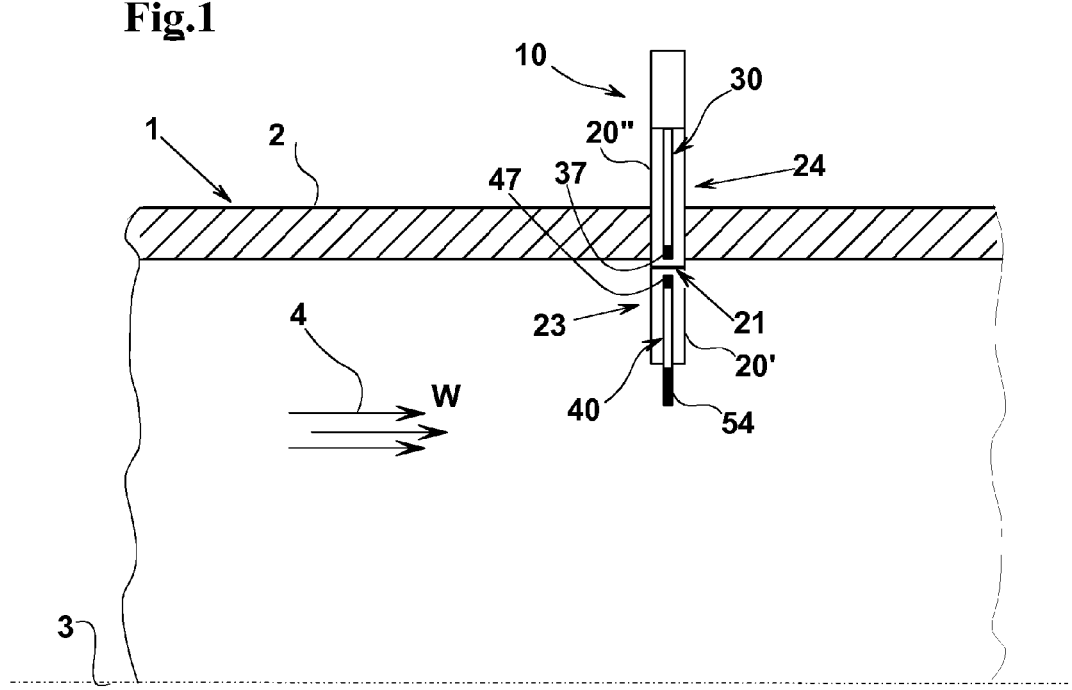
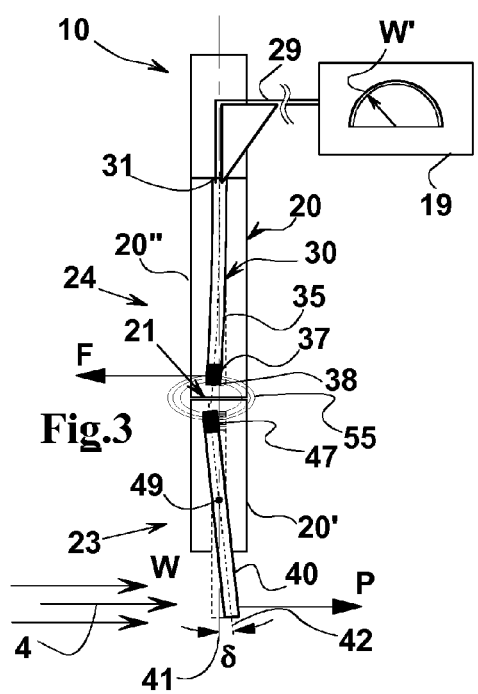
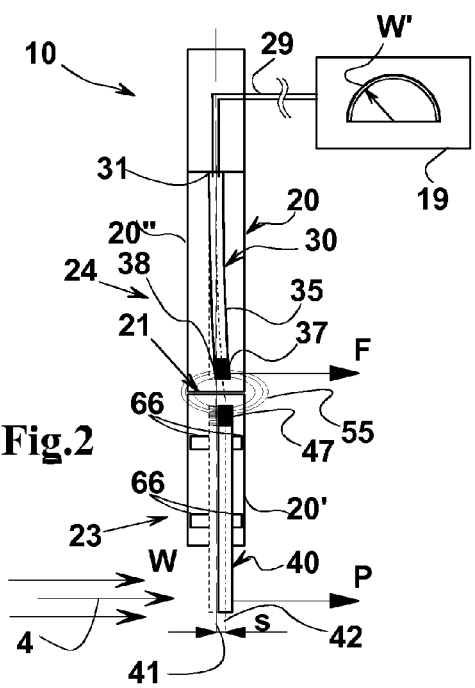

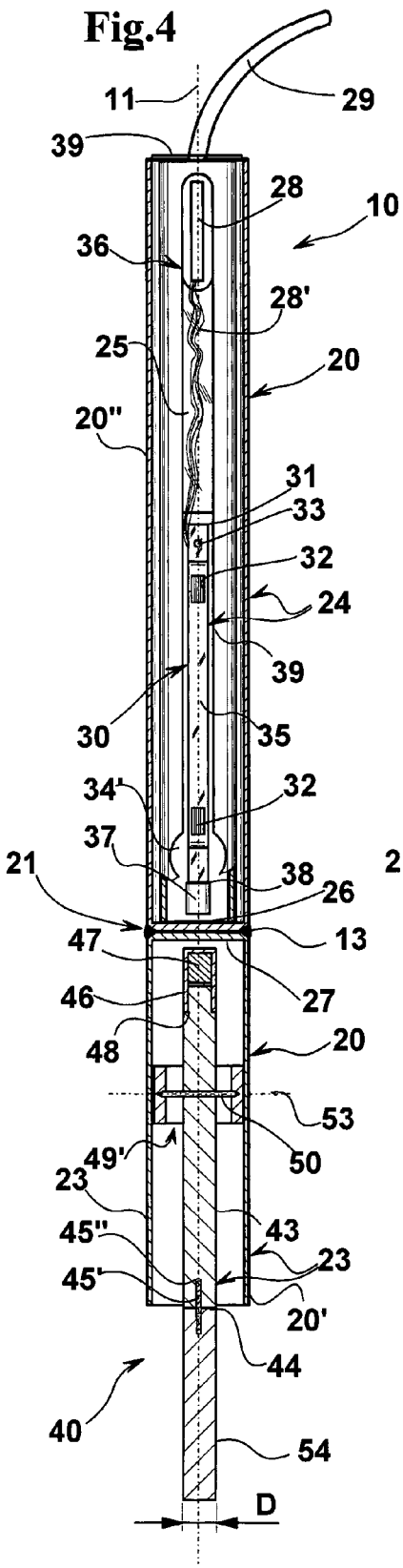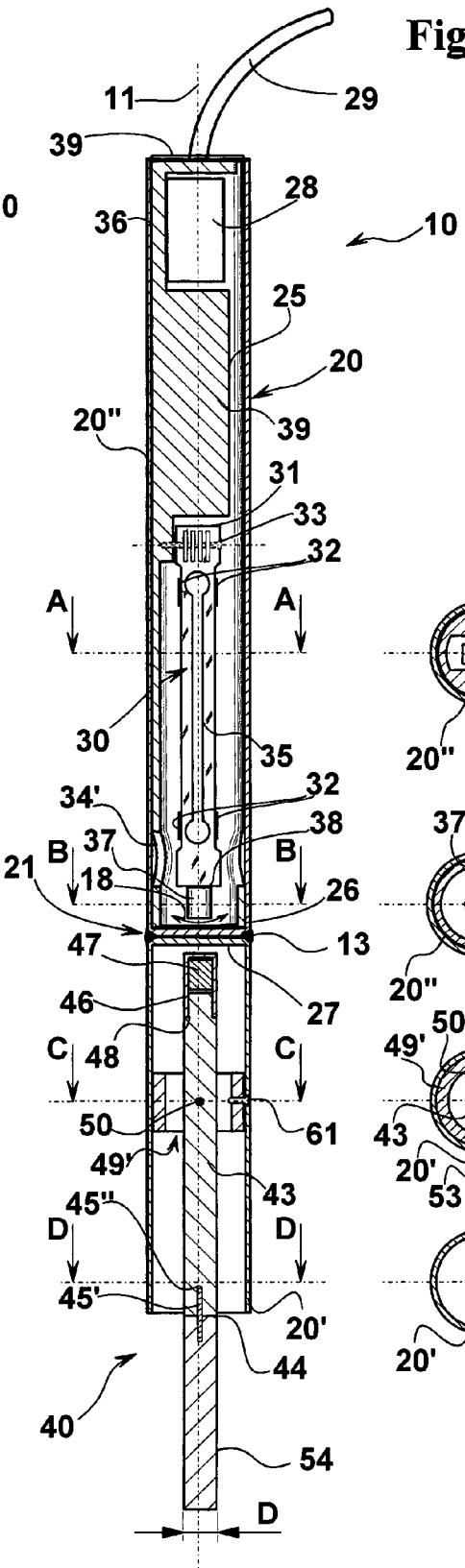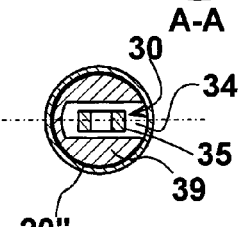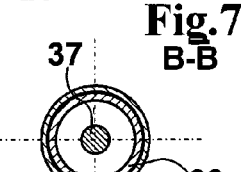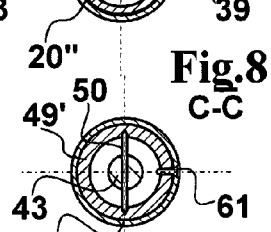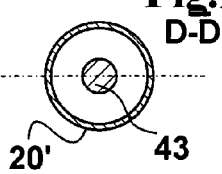

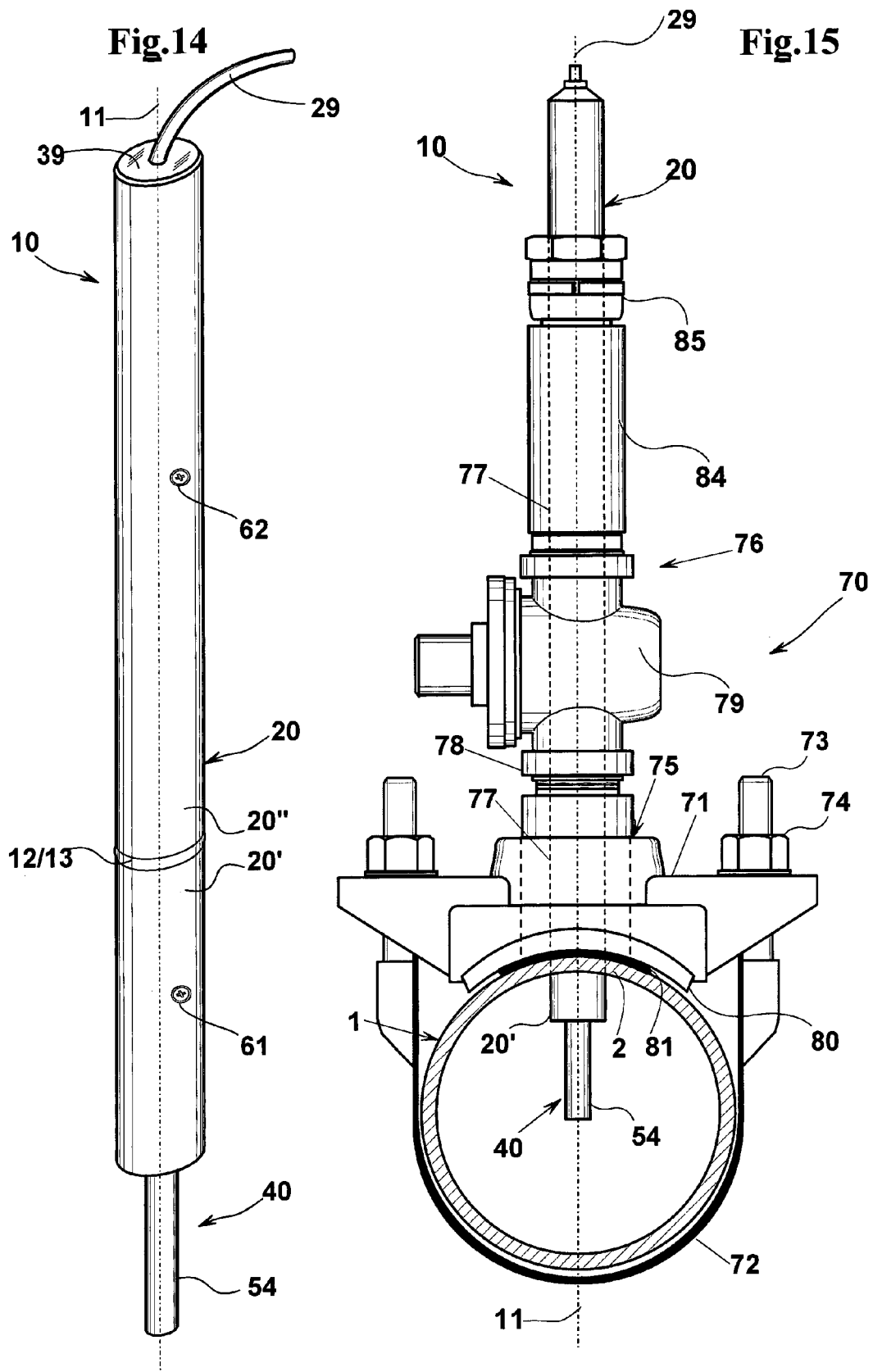

FLOW RATE SENSOR PROBE HAVING CONTACTLESS FORCE TRASNMITTING STRUCTURE

SCOPE OF THE INVENTION

The present invention generally relates to a device for measuring the flowrate of a fluid that flows within a pipe. More in particular, it relates to a flowrate sensor that is suitable for installation in a pipe of an extended network such as an aqueduct.

BACKGROUND OF THE INVENTION

The need is felt of measuring the flowrate of a fluid that flows within pipes of home and industrial fluid distribution networks. Such measurements are particularly important for controlling networks such as aqueducts. In particular, these measurements serve for watching single users' and communities water consumption rate. Moreover, such measurements are useful for detecting fluid leakage from the network.

Monitoring an extended and complex network such as an aqueduct requires the installation of a large number of flowrate meters. Therefore, low cost meters are preferred. Furthermore, it is important that these instruments can be easily and quickly mounted, inspected and replaced. In particular, it is important that these instruments can be inspected and replaced without stopping the fluid flow within the pipes.

In the case of extended networks, the sensors that are installed far from any electric supply network are preferably battery-supplied sensors. In this case, the sensors should preferably be low-consumption sensors, so that the batteries can work for a very long time, for example for some years.

Most of the well-known instruments provide a reliable measure in a relatively narrow measurement range. However, many well-known instruments cannot be used for flowrate measurements in aqueducts, for instance, this is the case of rotameters. Instruments of some well-known types cause a usually intolerable pressure drop, as in the case of about all the volumetric sensors and of the turbine sensors. Less protruding devices are also available, such as the thermal sensors and rotating blade sensors. This kind of sensors provides however a less accurate measurement and requires a very careful installation, which is therefore a critical factor. More accurate and more reliable devices are also known, such as the magnetic sensors and the Doppler sensors. However, due to the physical principle on which the measure is based, energy consumption is higher, and they are normally too expensive for a generalized installation in extended networks such as aqueducts.

Furthermore, most commercially available instruments must be mounted to a nozzle that is hydraulically connected with the duct. Therefore, the fluid flow must be stopped for installing such instruments.

Instruments are also known that allow measuring the flowrate by to measuring the elastic deformation of a probe that is cantilevered within the duct and is in contact with the flowing fluid. The elastic deformation is caused by a fluid dynamic thrust that the flowing fluid applies on the probe. This force, and then the deformation, depends upon the density of the fluid, upon the square of its speed and upon the wet surface area, and also upon the shape of the wet surface. Such devices are described, for instance, in GB 1,252,433 and in GB 830,211, and comprise a means for detecting the deformation, for example a strain gauge i.e. resistance strain gauges, which are arranged on the surface of the probe. The construction of these devices is relatively easy and cheap. However, the electric components that are used for measuring the deformation, which can extend on a relevant portion of the wet surface, must be suitably protected from the fluid. The protection means is made by a not conductive and electrically inert resin or ceramic sheath, or by a layer of a fluid- and preferably heat-resistant material. The protection means should also not reduce the elastic compliance of the probe. Therefore, the design and the construction of these devices is complicated by the coating and by the high temperature sensitivity of the probe. Furthermore, this may limit the application field, i.e. the working temperature range and the fluid type range. In any case, a probe comprising electrical component dipped into a fluid cannot ensure long-time reliability of such a measurement device, since the liquid may leak and stagnate under the coating in a short or long time. Therefore, such sensors are not suitable for installation in remote or somewhat impervious places, as it is often the case for aqueducts nor are they suitable if the fluid contains suspended solids, even occasionally.

Furthermore, when the fluid dynamic thrust ceases, the flowrate measurement devices based on such sensors as resistance strain gauges revert to a prefixed configuration that corresponds to a no-flow condition, i.e. they revert to a "zero" condition, after a significant delay.

Even improved versions of this type of instruments, as described in CN2859465 and U.S. Pat. No. 3,340,733, do not provide any solution to these problems.

Moreover, from US2007/0114023 a device is known which provides using a load cell that is arranged outside of the duct and that is provided with a mechanical connection with a probe that is immersed in the fluid and is movably arranged under the action of the flux. Such devices have the drawback of requiring a seal means that may break, in particular, in the case of remote installations. Accordingly, a leakage of the fluid is possible into the space containing the load cell, which may cause the load cell to be corroded or otherwise damaged.

Furthermore, the flowrate sensors that are based on the measurement of the force exerted by the flowing fluid on an immersed probe provide raw flowrate signals that are affected by the speed profile shape of the fluid flowing within the duct, at the detection point. This requires a process means for processing the raw signal provided by the load cell, which is able to integrate the hydro-dynamic thrust applied along the probe, and/or is able to compare the measure with a reference profile, and to correct it by suitable coefficients, in order to take into account the true distribution of the hydrodynamic thrust, and in order to take into account the deviation between this true distribution and the ideal distribution of the reference profile. This further complicates the construction of such force measurement-based devices.

US2006/248961 discloses a flow detection unit, i.e. a flow switch, for mounting to a duct of a sprinkler plant. The detection unit comprises a support that is adapted to move in case of movement of water within the duct. The support bears a sensor element that is adapted to detect a movement of the support, and a detection circuit is connected to the sensor, in order to produce a detection signal when the sensor element detects a movement of the support caused by a water movement within the duct. A signal processing circuit is also provided that is adapted to produce an alarm signal when the detection signal shows specific features. The support normally comprises a flexible blade arranged within the duct, and the sensor element is normally a load cell. In an exemplary embodiment, the load cell is arranged outside of the duct. In this case, the blade and the load cell are mounted to an inner face and to an outer face of a base element, respectively, i.e. of a flexible planar element that is mounted in a hole made through the wall of the duct. When a sprinkler head opens, the pressure within the tube drops suddenly, and the plane element bends towards within the duct, in such a way that the load cell experiences a deformation and produces a signal of the pressure drop. Such device has the drawback of not bearing a large number of deformation cycles of the flexible plane element, as it would occur in an attempt to use the device to as a flowrate measurement device, without damaging the flexible plane element and jeopardizing the seal capability and/or the operation of the load cell.

WO 99/50621 describes a flowrate sensor for installation in a duct of a drop-irrigation system comprising a drag blade that is pivotally arranged in the flow within the duct, and that is equipped with a first magnet, in such a way that it can move upwards and downwards responsive to the flowrate of the fluid. An indication lever is pivotally arranged outside of the duct, and is provided with a second magnet that is arranged to interact with the first one. This way, the external lever can arrange itself according to the movement of the internal blade. A position-adjustable counterweight is arranged on the lever, so that the lever is aligned with a given reference line to indicate a given flowrate value of the fluid within the duct.

SUMMARY OF THE INVENTION

It is therefore a feature of the present invention to provide a flowrate sensor for a fluid that flows within a duct, which has a probe that is resiliently movable or deformable under the fluid dynamic thrust exerted by the fluid, which does not require such protections as coating surface treatments of the sensor.

It is also a feature of the invention to provide such a cheap device, which allows advantageously monitoring fluid distribution extended networks such as aqueducts.

It is also a feature of the invention to provide such a low-consumption device, which in any case ensures measurement accuracy.

It is also a feature of the invention to provide such a device that comprises readily-available mechanical and electronic components.

It is also a feature of the invention to provide such a device that allows an easy and quick installation.

It is then a feature of the present invention to provide a flowrate sensor for a fluid flowing within a duct, which is based on the measurement of a thrust that the flowing fluid produces on a probe immersed in the flow, in which the measure is independent from the distribution of the speed and from the distribution of this thrust along the probe, and which avoids complicated processing of the raw force signals.

These and other objects are achieved, according to an aspect of the invention, by a device for measuring the flowrate of a fluid, or of a substance comparable to a fluid, which flows within a duct, the device comprising:
- a first portion and a second portion that are adapted to be connected to the duct by a fluid-tight fastening means, wherein the first portion protrudes within the duct and the second portion is left outside of the duct;
- a sensor means comprising:
    - a probe constrained to the first portion such that the probe in use is arranged within the duct, the probe equipped with a fluid engagement member that is configured to receive from the fluid a fluid dynamic thrust responsive to the flowrate and to perform a displacement due to the fluid dynamic thrust from a rest position, when the flowrate is zero, to a measuring position responsive to the flowrate;
    - a load cell constrained to the second portion, the load cell configured to receive from the probe a force responsive to the measuring position of the probe and for making and keeping an electric measurement signal responsive to the movement/measuring position and, therefore, to the flowrate of the fluid;
    - a data output means for exporting flowrate data that are obtained from the electric measurement signal;

wherein the first portion and the second portion are fluid-tightly separated by a fluid-tight wall, such that the probe is fluid-tightly separated from the load cell, wherein the main feature of the device is that the probe and the load cell comprise a contactless force transmitting means for transferring the force through the wall, said force responsive to the measuring position, between the probe and the load cell when the probe performs the movement and until the measuring position is maintained.

The probe and the load cell are mutually associated without coming into contact with each other. Nevertheless, it is possible to transmit to the load cell the thrust of the water that acts on the probe.

The fluid-tight wall arranged between the first portion, which is oriented towards the inside and is dipped in the fluid, and the second portion, which is oriented outwards of the duct, allows keeping the load cell out of the fluid that flows within the duct, even keeping the probe dipped in the fluid. Therefore, the load cell is not affected of erosion, abrasion, corrosion, chemical and/or galvanic attack, and the like, by the fluid, and does not require any particular protection means of its own electric components. For instance, no mechanically and/or thermally and/or chemically resistant coating is necessary. Such a coating, besides limiting the device lifetime, might also reduce the performances of the load cell, and so the performances of the device, in particular, by decreasing the elasticity of the compliant components of the latter.

Preferably, the wall or the dividing wall has at least one portion that is permeable to a magnetic field, and the contactless force transmitting means for transferring the force through the wall is a magnetic interaction means. In other words, the wall or the dividing wall is not able to block the magnetic field that is generated by the magnetic interaction means.

In particular the magnetic interaction means comprises respective magnetic elements or portions of the probe and of the load cell.

Advantageously, the respective magnetic elements or portions of the probe and of the load cell are arranged with opposite poles in front of opposite faces of the wall that is located between the first portion and the second portion of the device.

Preferably, the respective magnetic elements or portions of the probe and/or of the load cell are arranged at respective end portions of the probe and/or the elongated element of the load cell.

The magnetic element or the magnetic elements can be permanent magnets integrally bound to the probe and/or to the load cell, in case of two permanent magnets, these are connected to the second end of the elongated element of the load cell, which faces the wall, and to one end of the probe opposite to the fluid engagement member.

Advantageously, the first portion and the second portion are housed within one elongated tubular container body configured such that a first part of the hollow container body houses the first portion and protrudes within the tube, and that a second part of the hollow container body houses the second portion and protrudes outside of the duct, the two portions integral to each other.

In an exemplary embodiment, the first and the second part of the elongated tubular container body comprise respective tubular elements that have substantially the same diameter, said tubular elements aligned along a common axis and arranged to abut against each other, and the wall is a transverse dividing wall arranged between the respective tubular elements.

In particular, the tubular elements may be tubular elements whose respective ends are closed by respective substantially planar bottom portions, and the transverse dividing wall is obtained by integrally binding, in particular by welding the planar transverse bottom portions. Alternatively, the tubular elements have respective open ends, and the transverse dividing wall is a disc integrally bound, in particular welded between the open ends.

In particular, the load cell comprises a resiliently compliant member that is arranged to be resiliently deformed by the force responsive to the measuring position of the probe, and comprises also a deformation detection means for detecting a deformation of this resiliently compliant member. In an exemplary embodiment, the deformation detection means comprises a plurality of electric resistance extensometers, i.e. strain gauges. In particular, a unit may be provided comprising four electric resistance strain gauges in which the electric resistance are connected according to a Wheatstone bridge, which is a usual scheme for amplifying the output signal and making the measure substantially independent from the temperature of the environment where the measure occurs.

Alternatively, the deformation detection means comprises at least one piezoelectric strain gauge.

In particular, the load cell comprises an elongated resiliently compliant member, adapted to be resiliently deformed under the effect of the force which is responsive to the measuring position of the probe, bending with respect to an own longitudinal axis, wherein a first end of the elongated element is fixed to the second portion and a second end of the elongated element is arranged in front of the wall. Preferably, the deformation detection means is adapted to measure the deformation of at least one portion of the elongated compliant element where the deformation has a maximum value.

In an exemplary embodiment, the load cell is a linear axis load cell, i.e. a load beam cell, in which the elongated element has a slot made along this axis, the slot defining two longitudinal portions substantially parallel to each other, such that the parallel longitudinal portions perform a substantially translational relative movement with respect to each other due to the force which is responsive to the measuring position of the probe. In particular, the slot has enlarged end portions, such that the deformation of the elongated element under the action of the force is substantially equal to the deformation of a four-bar linkage. In particular, this load cell is a parallel beam type load cell or a binocular beam load cell.

The load cells of this type provide a signal that is not affected by the distance of the application point of the force. This makes it easier to make of the device, since it makes unnecessary a precision construction and mounting of the load cell and of the contactless force transmitting means to transmit the force which is responsive to the measuring position of the probe For the same reason, the load cells may be load a well-known type or commercial load cell, which is adapted to bear the loads that are expected on the basis of the speed of the fluid that flows within the duct.

In particular, such load cells can be made of aluminium. In this case, the manufacture is easier, which reduces the cost of the cell and so the cost of the device. The fluid-tight separation wall arranged between the load cell and the inside of the duct allows the use of a conventional cell, in particular of an aluminium cell with no corrosion or deposit risks. This makes it possible to limit the progressive performance fall of the of the cell and then also of the device.

In particular, the load cell is a piezoelectric load cell, i.e. the load cell can be made of a piezoelectric material.

In another exemplary embodiment, the bending type load cell is a lamina-shaped load cell.

Preferably, the lamina shape has a more compliant portion and at least one less compliant portion, and the deformation detection means is adapted to measure the deformation of the lamina shape at the more compliant portion. The deformation detection means is typically a plurality of resistance strain gauges in which the resistances are connected according to a Wheatstone bridge circuit.

Preferably, the more compliant portion is less thick than the less compliant portion or portions.

The diameter and the length of the probe are limited by the size of the hollow container body of the probe and by the diameter of the duct in which the device has to be installed, respectively. Therefore, in a preferred exemplary embodiment, the fluid engagement member of the probe has a cylindrical shape. This way, vibrations are less likely to take place than in the case of a different shape, in particular, than in the case of a flat and/or angled shape, for example a blade shape. In particular, the fluid engagement member has a diameter set between 2.5 and 22 mm, more in particular, a diameter set between 2.5 and 10 mm. The length of the engagement member of the probe may be set between 5 and 200 mm, more in particular, it may be set between 25 mm and 100 mm. The operation range and the flowrate measurement precision of the device can be adjusted by replacing the fluid engagement member of the probe with a different size one. The physical principle, as well as the adjustment possibility, makes it possible to obtain results that can be compared to the results that may be obtained from the most advanced ultrasound-based sensors.

Advantageously, the device comprises a pivotable constraint means such as a pivot point or a hinge between the probe and the first part of the container body, said constraint means arranged to allow the probe to rotate with respect to the first part of the container body, such that the movement from a rest position, when the flowrate is zero, to a measuring position responsive to the flowrate is a rotation, in particular, according to the flow direction of the fluid.

The pivotable constraint means divides the probe into an engagement portion, which comprises the fluid engagement member, and a free portion opposite to the engagement portion, wherein the ratio of the length of the engagement portion to the length of the free portion is preferably set between 0.9 and 2.5.

In a particular exemplary embodiment, the ratio of the length of the engagement portion to the length of the free portion is set between 1.5 and 2.2. These values of the length ratio of the two portions that the pivot point or the hinge, or an equivalent means, defines on the probe, assist the movement of the probe back to a predetermined no-flow position, i.e. they assist the stroke back to the predetermined rest position. This way, the zero-reset time is reduced. More in general, by this solution the instrument adapts itself more quickly to the flowrate changes, i.e. has a better measure readiness.

In another particular exemplary embodiment, the ratio of the length of the engagement portion to the length of the free portion is set between 0.95 and 1.05, more in particular, it is between 1 and 1.05, i.e. it is close to or slightly higher than one. This creates a condition of substantially neutral equilibrium of the probe with respect to the weight force, even if the device is installed in a non-horizontal portion of the duct and/or if the device is mounted in a non-vertical arrangement. In this case, the constraint means between the probe and the wet first part of the hollow container body may be advantageously associated with a resilient return means of the probe from a current measuring position towards the rest position, when the flowrate decreases.

In an alternative exemplary embodiment, the device comprises a constraint means between the probe and the first part of the container, which can allow a translation movement of the probe with respect to the first part of the container, such that the movement from a rest position, when the flowrate is zero, to a measuring position responsive to the flowrate is a translation movement, in particular according to the flow direction of the fluid. Even in this case, the constraint means between the probe and the first part of the hollow container body can be advantageously associated with a resilient means for recalling the probe towards the rest position, when the flowrate decreases.

As a consequence of the returning action, due to the weight force or to the resilient means, the device can detect the flow direction as well as the flowrate.

The cylindrical fluid engagement member of the probe may have depression and/or protrusions, with respect to a mean cylindrical surface. For example, such depressions and/or protrusions may be grooves and/or corrugations and/or projections that are preferably arranged side by side and/or have a substantially longitudinal direction, in particular along a direction parallel to the axis of the cylindrical shape.

Advantageously, the probe is made of a material conveniently compatible with the fluid, i.e. of a material that is adapted to support a chemical attack, for example a corrosion attack, and/or a mechanical attack, such as erosion or abrasion, and/or a thermal attack, due to the fluid, as it is expected to occur during a prefixed lifetime of the probe. Such material can be a metal material, to in particular a stainless steel, or a plastic material, preferably a material mainly comprising polyvinylchloride. The materials mainly comprising polyvinylchloride are particularly advantageous because they prevent surface deposits, such as limestone deposits, from forming to such a large extent as they would do on a different metal and/or plastic material.

According to another aspect of the invention, the above-mentioned objects are achieved by a method for measuring the flowrate of a fluid that flows within a duct having a fluid-tight wall, comprising the steps of:
  fixing a sensor means within said duct, comprising a probe equipped with a fluid engagement member;
    prearranging a measurement means for measuring said force, outside of said duct;
  said probe and said measurement means comprising a contactless force transmitting means for transferring a force through the wall, according to the position of said probe
    moving said probe from a rest position, when the flowrate is zero, to a measuring position responsive to the flowrate, in which said probe receives a fluid dynamic thrust responsive to the flowrate through said fluid engagement member, so that said contactless means transfer said force outside of said duct;
    measuring said force with said measurement means, by making and maintaining a measurement signal responsive to the movement/to the measuring position and, therefore, to the flowrate of the fluid;
    exporting flowrate data obtained from the measurement signal, wherein, in particular said transmission means and said means for measure comprise a magnetic interaction means such as a permanent magnet, and said measurement means comprise a load cell.

According to another aspect of the invention, the above-mentioned objects are achieved by a device for measuring a flowrate (W) of a fluid that flows within a duct, the device comprising:
  a hollow container body that is adapted to be connected to the duct by a fluid-tight fastening means with a first portion within the duct and a second portion outside of the duct;
  a sensor means comprising:
    a probe constrained to the container body, the probe arranged in use within the duct, and equipped with a fluid engagement member that is configured to receive from the fluid a fluid dynamic thrust responsive to the flowrate and to perform a displacement due to the fluid dynamic thrust from a rest position, when the flowrate is zero, to a measuring position responsive to the flowrate;
    a load cell having a first end portion of an elongated element integral to the hollow container body and a second end portion integral to the probe, such that the load cell can receive from the probe a force responsive to the measuring position, the load cell configured to produce and to maintain an electric measurement signal responsive to the displacement/position;
    a data output means for exporting flowrate data that are obtained from the electric measurement signal;
  wherein the load cell comprises an elongated resiliently compliant member adapted to be deformed by the bending force along an own longitudinal axis, wherein the main feature of the instrument is that the load cell is a linear axis load cell, wherein, in particular the elongated element has a longitudinal slot oriented along the axis, the slot defining two substantially parallel longitudinal portions that are configured in such a way that the parallel longitudinal portions perform a substantially translational relative movement with respect to each other due to the force.

The load cells of this type provide a signal that is independent from the distance of the application point of the force. For this reason, the measure is independent from the shape of the speed profile of the fluid that moves along the duct. The measure is therefore independent from the true distribution of the forces, i.e. of the hydrodynamic thrust that is received by the probe. In such conditions, no computing means must be associated with the processing means to treat the signal that is provided by the load cell, which are adapted to integrate the hydrodynamic thrust exerted along the probe, i.e. to define a reference profile of this thrust and then to make corrections by suitable correction parameters in order to take into account the true distribution of the hydrodynamic thrust.

The duct fluid-tight fastening means comprises a quick fluid-tight insertion joint means of known type, such as a tapping collar comprising a collar and a support connected to the collar by means of threaded lock elements for locking the collar about the duct. Such a connection is well suited for small diameter ducts, in particular for diameters up to ND400. This solution is advantageous because it makes it easier to orthogonally positioning the probe of the device, with respect to the axis of the duct, in an horizontal duct, or in any case it makes it easier a vertical positioning of the probe, such that the measurement is not affected by the weight of the probe.

Alternatively, the duct fluid-tight fastening means comprises an external thread of the hollow container body and an internal thread of the hole. In particular, the internal thread of the hole can be made on a sleeve welded on the duct. Such connection is well suited for large diameter ducts, in particular, larger than ND100.

Alternatively, the duct fluid-tight fastening means comprises a flange integrally arranged on the hollow container body, and preferably fixed to the duct.

Advantageously, the data output means for exporting flowrate data obtained from the electric measurement signal are associated with a data treatment means, i.e. with a means for conditioning the signal produced by the sensor element, i.e. by the load cell, and is also associated with an analogue or digital data transmission means and/or to an electromagnetic waves transmitter.

The measurement circuit, and the electronic process means and/or measure transmission means can be arranged within the second part of the container body, or in a control module that is separated from the hollow container body to which the sensor means may be connected by conventional electric connection means, such as a cable and a suitable connector.

Advantageously, the control module is provided with a means for calibrating the zero of the device before introducing the device into the duct, in order to eliminate measurement errors due to the weight of the probe.

In order to limit the energy consumption of the device, the signal conditioning means and the data transmission means, may use conventional techniques such as a pulsed power supply of the various functional blocks. The load cell detection system is particularly well suited for these conventional and widespread techniques.

This way, a low consumption control means is obtained, which can be easily supplied with batteries at a recharge frequency of even some years.

The possibility a minimum energy consumption network connection makes the device well suited for wide fluid distribution networks monitoring applications, in which a large number of measure points are present. For instance, the device is well suited for wide distribution networks such as urban and extra-urban aqueducts.

Advantageously, due to the very low energy consumption, an energy means can be provided different from a battery package. For instance, electric supply means are possible such as solar or small wind power supply means or micro-hydraulic supply means. In particular, but without excluding other means that will be developed in the future, energy sources can be exploited that are adapted to catch energy from the flow of the water within the duct or from the temperature difference between the fluid and the surrounding ground.

Furthermore, the device can be used for measuring the force or the hydrodynamic thrust of a fluid in relative movement with respect to the instrument, not necessarily in the field of a flowrate measurement or in the field of a flowrate measurement within a duct. For instance, the instrument can be advantageously used for measuring the relative speed of a liquid and of a gas flow, or of a flowing material that can be assimilated to a liquid and/or to a gas, with respect to the device.

BRIEF DESCRIPTION OF THE DRAWINGS

The invention will be now shown with the following description of an exemplary embodiment thereof, exemplifying but not limitative, with reference to the attached drawings in which:

FIG. 1 diagrammatically shows a device for measuring the flowrate of a fluid installed in a duct according to the present invention;

FIGS. 2 and 3 show diagrammatically exemplary embodiments of the instrument of FIG. 1 according to two different restraint models of the probe with respect to the container body;

FIG. 4 is a partial longitudinal cross-sectional view of a device according to an exemplary embodiment of the invention, where the cross-sectional plane is the bending plane of the load cell;

FIG. 5 is a partial longitudinal cross-sectional view of the device of FIG. 4, taken along a plane that comprises the axis of the device and is perpendicular to the sectional plane of FIG. 4;

FIGS. 6 and 7 are cross-sectional views of the device of FIG. 5, taken along planes that cut the load cell and a magnet integral thereto, respectively;

FIGS. 8 and 9 are cross-sectional views of the device of FIG. 5, taken along cross-sectional planes which cut the probe;

FIG. 14 is a perspective view of the instrument of FIGS. 4 and 5;

FIG. 15 is a cross-sectional view of a duct on which a measurement device is installed according to an exemplary embodiment of the invention.

DESCRIPTION OF PREFERRED EXEMPLARY EMBODIMENTS

Figure 10:
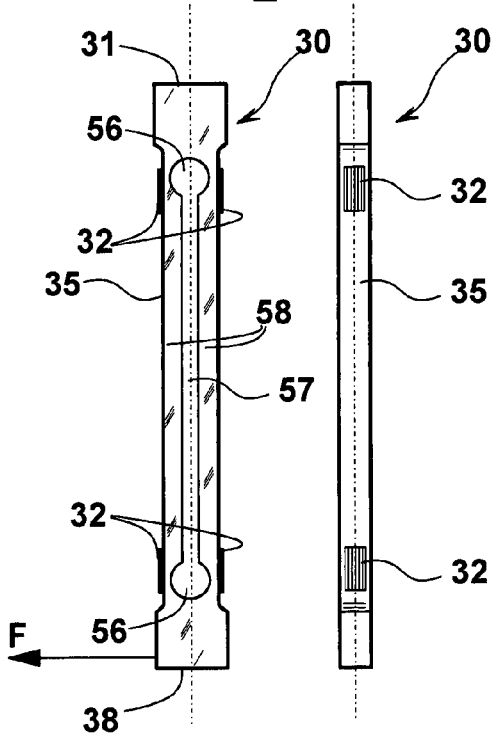
FIGS. 10 and 11 show load cells of devices according to respective exemplary embodiments of the invention.

With reference to FIG. 1, a device 10 is described for measuring the flowrate W of a fluid 4 that slides through a duct or pipe 1. Device 10 comprises a first portion 23 that protrudes into duct 1 and a second portion 24 that protrudes outside of duct 1.

In particular, first portion 23 and second portion 24 are housed within an elongated tubular, i.e. hollow, container body 20 arranged such that a first part 20' of the hollow elongated container body 20 houses first portion 23 and protrudes within duct 1 and a second part 20" of the hollow container body 20 houses second portion 24 and protrudes outside of duct 1. In this case, the first and the second part of the hollow elongated container body comprise respective tubular elements 20',20" that have substantially the same diameter, are aligned along a common axis 11 and arranged to abut against each other, and are separate by a transverse dividing wall 21 arranged between respective tubular elements 20',20".

A sensor means is arranged within hollow elongated container body 20 comprising a probe 40 that is constrained to first part 20' of hollow elongated container body 20 and a load cell 30 that is constrained to second part 20". Probe 40 has an end element comprising an engagement member 54 that protrudes from hollow container body 20 into duct 1, and that is therefore exposed to the flow of fluid 4.

As shown in FIGS. 2 and 3, which relate to two exemplary embodiments of probe 40, probe 40 receives a fluid dynamic thrust P through engagement member 54, said thrust responsive to flowrate W and to the true surface of engagement member 54 that is exposed to fluid flow 4. Due to thrust P, probe 40 moves to a measuring position 42, which depends upon flowrate W, carrying out a displacement s, δ with respect to a rest position 41 that probe 40 occupies when no flow is present. Load cell 30 is arranged to receive from probe 40 a force F that depends upon measuring position 42 of probe 40, i.e. upon displacement s, δ. Furthermore, load cell 30 as such is adapted to produce an electric measurement signal responsive to position 42 i.e. responsive to displacement s, δ and, therefore, to flowrate W of fluid 4, as well as to the true surface of engagement member 54 that is exposed to fluid flow 4. A conventional electric connection means 29 conveys this electric signal to a local and/or remote control and/or display unit of signal 19.

First and second part 20', 20" of hollow elongated container body 20 are separated from each other by wall 21 that is impervious for fluid 4, therefore load cell 30 and probe 40 are fluid-tightly separate components, unlike the above-mentioned prior art devices.

Probe 40 and load cell 30 comprise a contactless force transmitting means 47,37 for transferring force F from probe 40 to load cell 30 through wall 21, such that when probe 40 moves and/or maintains measuring position 42, load cell 30 is forced by force F.

In the exemplary embodiment of FIG. 2, probe 40 is constrained to first part 20' of hollow elongated container body 20 by means of guide elements 66 that are slidably engaged by probe 40, such that probe 40 can carry out a translation movement s under the action of fluid dynamic thrust P, in particular moving from rest position 41, in case of no flowrate, to measuring position 42 that is responsive to flowrate W, according to the flow direction of fluid 4.

In the exemplary embodiment of FIG. 3, instead, probe 40 is constrained to first part 20' by a pivotable connection means 49 of known type, which comprises a pivot point or a hinge, such that probe 40 can carry out a rotation movement δ under the action of fluid dynamic thrust P, in particular moving from rest position 41 in case of no flowrate to measuring position 42 responsive to flowrate W, according to the flow direction of fluid 4.

Even if in FIGS. 2 and 3 a load cell 30 is shown which comprises a compliant elongated member 35 adapted to bend along an own longitudinal axis under shear force F, load cell 30 can be of any type that is suitable for detecting a force F received from probe 40. In the exemplary embodiment, as shown in FIGS. 2 and 3, compliant elongated member 35 has a first end portion 31 that is bound to second part 20" of hollow elongated container body 20, for example by means of a fixed joint, and also has a second end portion 38 that is free and arranged in front of wall 21.

FIGS. 4 and 5 show longitudinal cross sectional views of a device 10 according to an exemplary embodiment of the invention, wherein a support 39 of the load cell is provided that has a generally cylindrical portion arranged in first part 20" of hollow elongated container body 20. First end portion 31 of load cell 30 is bound to support 39 by a fixed joint, whereby it is cantilevered towards wall 21 that separates first and second parts 20', 20" of hollow elongated container body 20. For instance, the fixed joint may comprise a fastening screw 33 that engages respective housings of compliant elongated member 35 of the load cell and of support 39. FIGS. 4 and 5 are partial cross-sectional views of a device 10, according to an exemplary embodiment of the invention, which has all the features of device 10 of FIG. 3, as well as further features or construction features as described below. Even in this case, load cell 30 comprises an elongated resiliently compliant member 35, and a plurality of strain gauges 32, i.e. a plurality of elements that are adapted to detect the deformation of compliant elongated member 35. Strain gauges 32 can be of any well-known type that is adapted to detect this deformation and to produce electric signals responsive to the deformation, for example, they may be conventional electric resistance strain gauges. In FIG. 4, two strain gauges 32 are shown arranged on a side of elongated resiliently compliant member 35. As shown in FIG. 5, strain gauges 32 can be four, two of which are arranged on the side opposite to the side shown in FIG. 4. The resistances of the strain gauges, not shown in FIGS. 4 and 5 for the sake of clear representation, are in this case supplied with a direct or an alternating voltage or current through an electric connection means 28', 29 of known type, and are connected to a measurement circuit 28 that can be a measurement circuit of known type, preferably a measurement Wheatstone bridge circuit, which is commonly used with resistance strain gauges. In an exemplary embodiment, as shown in FIG. 5, measurement circuit 28 is arranged within second part 20" of hollow elongated container body 20, typically in a housing 36 made in support 39. Between the connection edge of support 39 for connecting end 31 of compliant elongated member 35 and housing 36, a flat portion 25 is present, on which electric wires 28' are laid that are connected to the resistances of strain gauge 32, as shown only in FIG. 4, for supplying the strain gauges and transferring the electric signals to each resistance.

Alternatively, strain gauges 32 can be piezoelectric strain gauges instead of resistance strain gauges for measuring the deformation of compliant elongated member 35.

In the instrument according to the exemplary embodiment shown in FIGS. 4 and 5, contactless force transmission means 37,47 for remotely transmitting force F through wall 21 is a magnetic interaction means or, more in particular, a magnetic coupling means, i.e. mounted elements or integral portions of load cell 30 and of probe 40, at least one of which is adapted to create a magnetic field 55 (FIG. 3) and at least one of which is adapted to receive a force associated with magnetic field 55. The above embodiment requires that at least one portion of wall 21 is made of a material substantially permeable to magnetic field 55, such as stainless steel.

In the exemplary embodiment shown in FIGS. 4 and 5, both probe 40 and load cell 30 comprise magnetic elements 47, 37 at respective end portions 48 and 38. In particular, the magnetic elements can be permanent magnets 47, 37 of known type. Advantageously, magnets 47, 37 are arranged in front of opposite faces 26,27 of separation wall 21.

Permanent magnet 37 can be bound to end portion 38 of load cell 30 by conventional bind means, for example by adhesive means, since the load cell is housed in a dry place of second part 20" of hollow elongated container body 20. Permanent magnet 47 is preferably arranged in a place impervious to fluid 4, with which probe 40 comes into contact. For example, magnet 47 can be arranged in a recess made between end portion 48 of probe 40 and a hood 46 made of a magnetically permeable material, which is adapted to firmly and fluid-tightly engage probe 40 to block fluid 4, for example by a suitable thread.

This way, a displacement of end portion 48 of probe 40 causes a displacement of free end portion 38 of load cell 30 that, since the latter is cantilevered to support 39, undergoes a bending deformation, as indicated by arrow 18 of FIG. 4. The displacement of free end portion 38 of load cell 30 during the measurement of the flowrate is about some tenths of millimeter or at most a few millimeters.

FIGS. 6 and 7 are cross-sectional views of the device of FIG. 5, taken along cross-sectional planes A-A and B-B that cut load cell 30 at the compliant elongated member 35 and at permanent magnet 37, respectively. Load cell 30 is housed within a recess 34' made within support 39 to allow a free deformation of elongated element 35. Two holes 34 are made at diametrically opposite positions of support 39.

FIGS. 8 and 9 are cross-sectional views of the device of FIG. 5, taken along cross-sectional planes C-C and D-D that cut probe 40 at a pin 50 of pivotable connection means 49 between probe 40 and first part 20', and at a generic cross section of an engagement portion 43 of probe 40, respectively.

FIG. 10 shows more in detail linear axis load cell 30 of device 10 of FIG. 5. Compliant elongated member 35 of cell 30 has a slot 57 made along axis 12, which defines two longitudinal portions 58 of compliant elongated member 35 substantially parallel to each other. When the cell receives shear force F, the substantially parallel longitudinal portions substantially translate with respect to each other, in particular enlarged end portions 56 of slot 57 are provided such that compliant elongated member 35 behaves approximately like a four-bar linkage. The essential features of parallel beam type cells or binocular type cells can be recognized in this load cell. Four strain gauges 32 are arranged in pairs on opposite faces of compliant elongated member 35, close to enlarged end portions 36, i.e. they are arranged where the deformation of longitudinal portions 58 is at a maximum.

Figure 11:
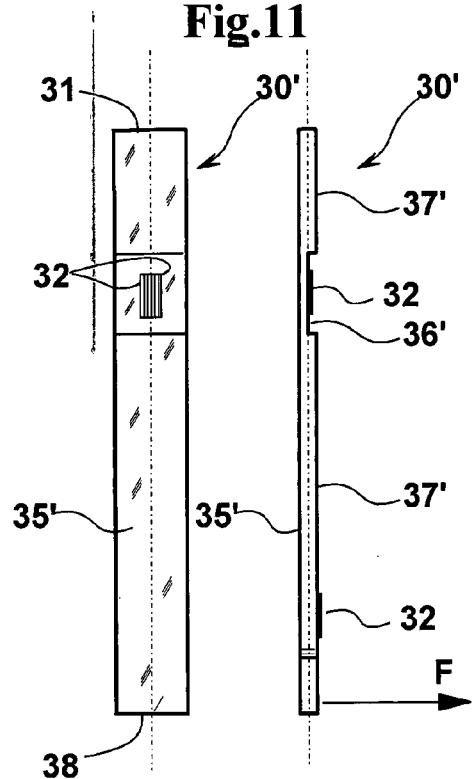

FIG. 11 shows a lamina-shaped load cell 30' that can be used in instrument 10 instead of load cell 30 of FIG. 10. The lamina 35' has a more compliant portion 36', typically a portion that has a thinner cross section, and two less compliant portions 37', typically portions that have thicker cross sections extending laterally with respect to thinner cross section 36', at which a plurality of strain gauges 32 are arranged, typically four strain gauges that are connected to a Wheatstone bridge measurement circuit, not shown.

Figure 12:
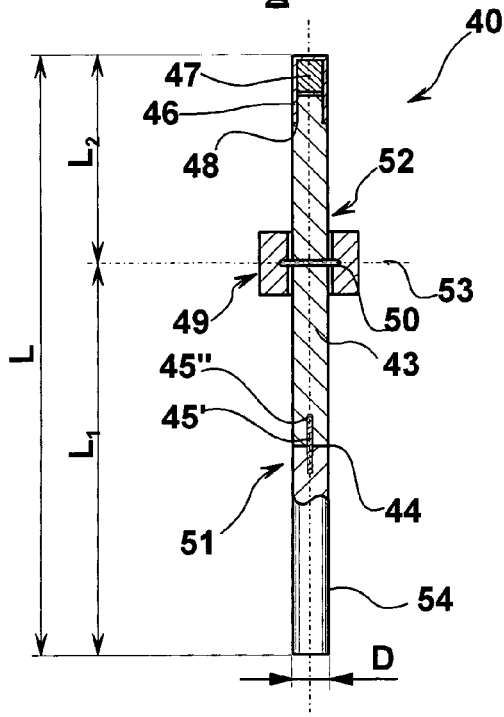
FIGS. 12 and 13 are partial cross-sectional views of a probe according to respective specific exemplary embodiments.
Figure 13:
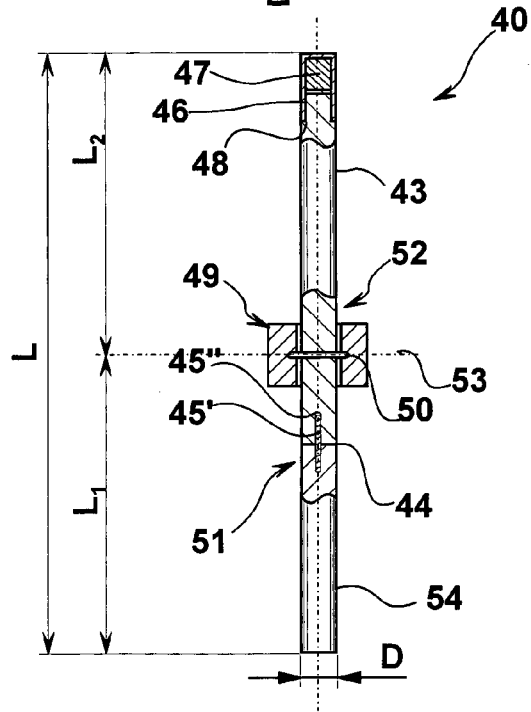

FIG. 12 shows, more in detail, probe 40 of device 10 of FIGS. 4 and 5. Another exemplary embodiment of probe 40 is shown in FIG. 13, as better described hereinafter. Probe 40 has a pivotable constraint means 49 at first part 20' of hollow elongated container body 20, said pivotable constraint means comprising a bush 49' (FIG. 4,5) that is adapted to be inserted into second part 20' of hollow elongated container body 20, and also comprising pin 50 arranged between two housings of bush 49' through a transverse hole of a rod core 43 of probe 40, such that core 43 can rotate about its own axis 53 performing a swing movement with respect to bush 49'. Bush 49' can be bound to first part 20' of hollow elongated container body 20 by at least one screw 61. The hinge constraint about axis 53 divides core 43 of probe 40 into an engagement portion 51 that comprises fluid engagement member 54 and into a free portion 52 opposite to the engagement portion.

In the exemplary embodiment of FIGS. 12 and 13, engagement member 54 has a cylindrical shape. Diameter D of engagement member 54 is preferably set between 2.5 and 22 mm, more preferably it is set between 2.5 and 10 mm. Still in the exemplary embodiment of FIGS. 12 and 13, the length L of probe 40, including the length $L_l$ of engagement member 54, ranges between 25 mm and 100 mm. The diameter D of the engagement member is selected taking into account the diameter of duct 1 in which device 10 must be mounted, and the size of hollow elongated container body 20 of the device, taking into account the limitations that this diameter and this size imposes.

The cylindrical engagement member of probe 40 may be provided with grooves and/or with corrugations and/or with protrusions, not represented, which are preferably alternate and/or which preferably extend longitudinally, in particular along a direction parallel to the axis of the cylindrical shape.

In FIGS. 1-3, device 10 is installed in a substantially horizontal duct 1, and longitudinal axis 11 of device 10 is substantially vertical. In the devices of FIGS. 3, 4 and 5, probe 40 and pivotable connection means 49 are advantageously made in such a way that, upon ceasing of flowrate W, the weight force causes the probe to return to rest position or zero-position 41 in a reasonably short time. More in general, probe 40 and pivotable connection means 49 are made in such a way that, upon a change of flowrate W, probe 40 move to the corresponding measuring position 42 in a substantially negligible time with respect to the time the flowrate change takes to occur, which enhances measure precision and readiness. This can be obtained as shown in FIG. 12, where length of engagement portion 51 is longer than length $L_2$ of free portion 52, i.e. ratio $L_1/L_2$ is more than 1, if the mass is substantially uniformly distributed along core 43 of probe 40, which comprises engagement member 54. In FIG. 12, an exemplary embodiment is shown in which ratio $/L_2$ is about 2, even if any value greater than 1 may be used and, in particular, any value between 1.5 and 2.2. Engagement member 54 is releasable from the remainder portion of the core, and it can be replaced with engagement members having a different length and/or a different diameter and/or a different shape, taking into account the duct diameter and the requirements of the measure, in order to select a suitable value of ratio $L_1/L_2$ of length $L_l$ of engagement portion 51 to length L2 of free portion 52, which are preferably set within the above-mentioned range. The connection between engagement member 54 and the remainder portion of core 43 can be made using a conventional means, for example a screw threaded means such as a threaded rod integral to one joined portion, and a screw threaded housing made in the other joined portion, said housing adapted to receive the threaded rod. A conventional self-unscrewing preventing means, not shown, may be provided at an interface section 44 between engagement member 54 and the remainder portion of core 43 to prevent the screw threaded joint from loosening, and to prevent engagement member 54 from possibly being lost in fluid 4 within duct 1.

A device 10 equipped with t a pivotable connection means between probe 40 and first part 20' of hollow elongated container body 20 can be installed, in any case, also in non-horizontal duct portions and/or it can be mounted in a non-vertical arrangement. In this case, probe 40 and pivotable connection means 49 are advantageously made in such a way to create a substantially neutral equilibrium condition of probe 40 with respect to the weight force. This can be obtained as shown in FIG. 13, where length $L_1$ of engagement portion 51 is close to length $L_2$ of free portion 52, i.e. ratio $L_1/L_2$ is about 1, if the mass is substantially uniform along core 43 of probe 40, including engagement member 54. In FIG. 12, an exemplary embodiment is shown in which ratio $L_1/L_2$ is about 1, for example it can be set between 0.95 and 1.05, more in particular, it can be set between 1 and 1.05.

However, the control module i.e. the local control unit 19 is advantageously equipped with a means for calibrating the zero of the device before introducing the device into duct 1, in order eliminate measurement errors due to the weight of the probe, which may occur also in vertical installations, if a small deviation from a vertical arrangement occurs during the installation.

Even if in the description, and in FIGS. 2 to 5, reference is made only to bending load cells that comprise strain gauges 32, load cell 30 can also be a compression and/or a tension and/or a torsion load cell, or a cell adapted to undergo a deformation according to a combination of the above deformation modes.

Furthermore, even if in FIGS. 2 to 5 only a strain gauge load cell has been shown for measuring the deformation, a different type load cell can also be used, for instance a piezoelectric load cell i.e. a load cell made of a piezoelectric material.

Parts 20' and 20" have substantially equal transverse sections, in order to assist their mutual alignment along common axis 11, as shown in FIG. 14, which makes it possible to mount the instrument in a fluid-tight device comprising a housing that is tubular as well, as it is better described hereinafter.

Tubular portions 23,24 are arranged to abut against each other on inner partition wall 21. In particular, tubular portions 20' and 20" can be obtained from abut-arranged tube portions of the same outer diameter, the tube portions bound to each other in a known way at opposite sides of a circular disc that forms wall 21, in particular the portions bound to the disc by a circumferential welding 13.

The closed tubular shape of first part 20' of hollow elongated container body 20 extends within duct 1 to create a quiet zone, whereby only the engagement portion 40 is affected by the fluid dynamic thrust of fluid 4;

FIG. 15 shows device 10 mounted to duct 1 by a fluid-tight fastening means 70. In particular, fastening means 70 may be a releasable a fluid-tight lock means of known type, for example means for known type, such as a "surrounding" lock means comprising a support 71 that can be arranged on the outer surface of duct 1 at the detection point, and also comprising a collar 72 adapted to fasten support 71 on duct 1. Collar 72 is provided with threaded rod extensions 73 adapted to engage support 71 and to receive nuts 74 for locking collar 72 and support 71 about duct 1. Support 71 comprises a gasket 81 and a duct engagement member that is configured to compress the gasket upon the duct. Support 71 also comprises a housing 75 for a stem guide 76 that has a cavity 77 for receiving the hollow elongated container body of measurement device 10, for example cylindrical hollow elongated container body 20 of device 10 as shown in FIGS. 4, 5 and 9. A sleeve 78 of stem guide 76 is also provided that is adapted to receive a drill means to bore shell 2 of duct 1, not shown, for example a conventional drill means, that is suitable for creating an access hole for device 10 into duct 1, as well as a shut-off valve 79 arranged outside of sleeve 78 for closing cavity 77 once a preparatory hole has been made through shell 2. This way, it is possible to create an access for device without stopping the flow of fluid 4 within duct 1 and without loosing a significant amount of fluid 4 through the hole. Once instrument 10 has been provisioned, and a nozzle 84 has been mounted at the outlet side of valve 79, which provides a further portion of cavity 77 of stem guide 76, it is possible to put device 10 into cavity 77 and the to lock it by a double joint 85, without either stopping the flow or considerably loosing fluid by duct 1.

As an alternative, the fluid-tight fastening means on duct can comprise a sleeve, not shown, which is arranged orthogonally and welded on duct 1 instead of the fastening gripping in load to collar 70.

In a further alternative, the fluid-tight fastening means on duct 1 comprises a flange integral to container body 20 and preferably suitable for fixing on duct 1.

The foregoing description of specific exemplary embodiments will so fully reveal the invention according to the conceptual point of view so that other, using the prior art, will be able to modify and/or to adapt for various applications these specific exemplary embodiments without further researches and without parting from the inventive concept, and it is therefore to be to understood that such adaptation and changes will have to be considered ad as equivalent of the specific exemplary embodiments. The means and the material to provide the various functions described herein could have a different nature without, for this reason, departing from the scope of the invention. It is to be understood that the expressions or the terminology used that is employed herein is for the purpose of description and not of limitation.

The invention claimed is:

1. A device for measuring a flowrate of a fluid that flows within a duct, said device comprising:
    a first portion and a second portion that are adapted to be connected to said duct by a fluid-tight fastening means, wherein said first portion protrudes within said duct and said second portion is left outside of said duct, said first portion and second portion having a common axis;
    a probe constrained to said first portion, said probe configured to be arranged within said duct, said probe equipped with a fluid engagement member that is configured to receive from said fluid a fluid dynamic thrust responsive to said flowrate and to perform a measurable displacement due to said fluid dynamic thrust from a rest position, when said flowrate is zero, to a measuring position responsive to said flowrate;
    a load cell constrained to said second portion, said load cell configured to receive from said probe a force according to said measuring position and to produce/maintain an electric measurement signal responsive to said movement/measuring position;
    an electric connection arranged to convey said electric measurement signal to a local and/or remote control and/or display unit of said signal for exporting flowrate data that are obtained from said electric measurement signal;
    wherein said first portion and said second portion are fluid-tightly separated by a fluid-tight wall of said device transverse to said axis, wherein said wall has at least one wall portion that is permeable to a magnetic field;
    wherein said probe and said load cell comprise respective magnetic elements that are associated with said probe and/or with said load cell, respectively, and/or it comprises magnetic portions of said probe and/or of said load cell, arranged for transferring magnetically said force to each other through said wall portion that is permeable to a magnetic field, in such a way that said force is transferred to said load cell through said wall portion responsive to said measuring position, between said probe and said load cell when said probe performs said measurable displacement and until said measuring position is maintained.

2. A device according to claim 1, wherein said respective magnetic elements or portions of said probe and/or of said load cell are arranged with opposite poles in front of opposite faces of said wall.

3. A device according to claim 1, wherein said respective magnetic elements or portions of said probe and/or of said load cell are arranged at respective end portions of said probe and/or of an elongated element of said cell.

4. A device according to claim 1, wherein said first portion and said second portion are housed within one hollow elongated container body configured such that a first part of said hollow elongated container body houses said first portion and protrudes within said tube and that a second part of said hollow elongated container body houses said second portion and protrudes outside of said duct, said two parts of said hollow elongated container body integral to each other.

5. A device according to claim 4, wherein said first and second parts of said hollow elongated container body comprise respective tubular elements that have substantially the same diameter, said tubular elements aligned along a common axis and arranged to abut against each other, and said wall is a transverse dividing wall arranged between said respective tubular elements.

6. A device according to claim 4, comprising a pivotable constraint means between said probe and said first part of said hollow elongated container body, said constraint means arranged to allow a rotation of said probe with respect to said first part of said hollow elongated container body, such that said measurable displacement is a rotation according to a flow direction of said fluid, said pivotable constraint means defining on said probe an engagement portion that comprises said fluid engagement member, and a free portion opposite to said engagement portion, said engagement portion and said free portion having respective lengths;

wherein the ratio of said length of said engagement portion to said length of said free portion is set between 0.9 and 2.5.

7. A device according to claim 6, wherein said ratio of said length of said engagement portion to said length of said free portion is set between 0.95 and 1.05, in particular it is set between 1 and 1.05.

8. A device according to claim 6, wherein said ratio of said length of said engagement portion to said length of said free portion is set between 1.5 and 2.2.

9. A device according to claim 1, wherein said load cell comprises an element that is resiliently compliant and is arranged to be resiliently deformed by said force, and a strain gauge for detecting a deformation of said resiliently compliant member, the strain gauge selected from the group consisting of:

a plurality of electric resistance strain gauges; and
one or more piezoelectric strain gauges.

10. A device according to claim 1, wherein said load cell comprises an elongated element which is resiliently compliant and is configured to be resiliently deformed by said force an to bend with respect to said axis, wherein a first end of said elongated element is fixed to said second portion and a second end of said elongated element is arranged in front of said wall.

11. A device according to claim 10, wherein said load cell is a linear axis load cell, in which said elongated element has a slot made along said axis, said slot defining two longitudinal portions substantially parallel to each other, such that the substantially parallel longitudinal portions perform a substantially translational relative movement with respect to each other due to said force.

12. A device according to claim 1, wherein said load cell has a lamina shape, said lamina shape having a thinner portion and at least one thicker portion, said thinner portion having a cross section thinner than said thicker portion, so that said thinner portion is more resiliently compliant than said thicker portion, and a means is provided comprising a plurality of strain gauges arranged at said thinner portion, and a Wheatstone bridge measurement circuit connected thereto for measuring a deformation of said lamina shape that is adapted to measure the deformation at said thinner portion.

* * * * *